J. L. MASK & T. F. MADDOX.
FERTILIZER DISTRIBUTER.
APPLICATION FILED FEB. 14, 1916.
1,238,170.
Patented Aug. 28, 1917.
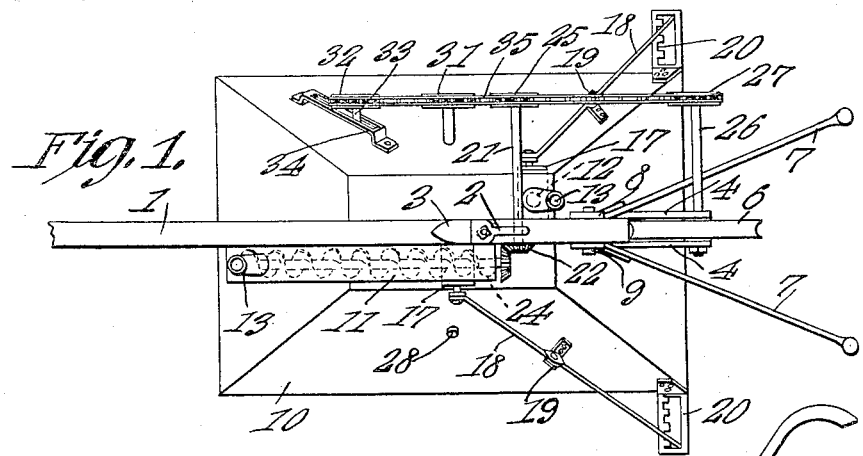
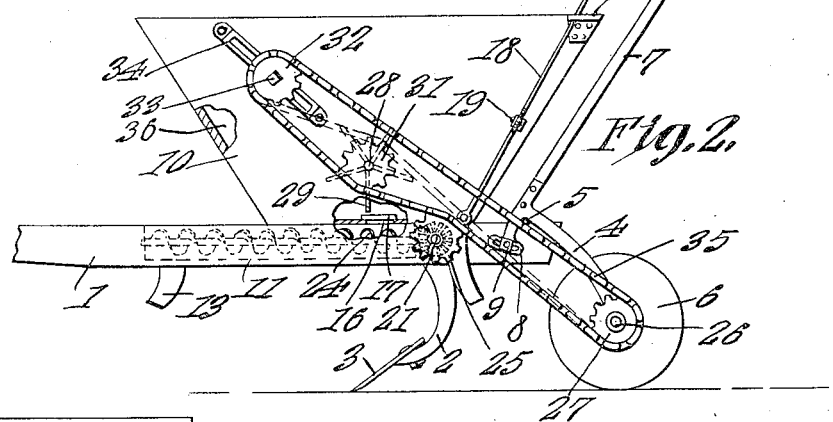
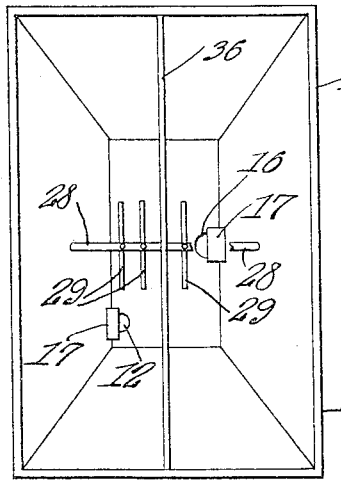
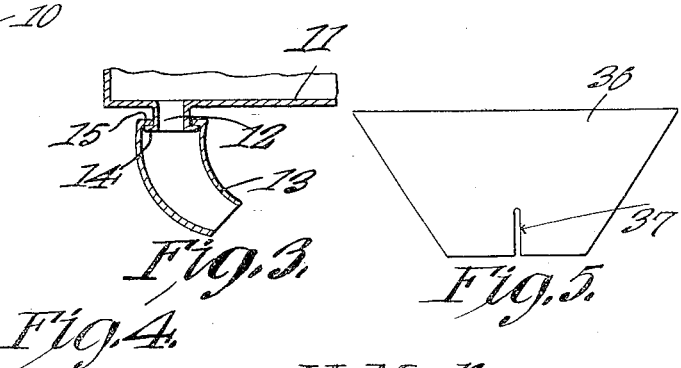
Witnesses
J. L. Mask and
T. F. Maddox, Inventors
by C. A. Snow & Co.
Attorneys

UNITED STATES PATENT OFFICE.

JOHN LEWIS MASK AND THOMAS FRANKLIN MADDOX, OF COVINGTON, GEORGIA.

FERTILIZER-DISTRIBUTER.

1,238,170.  Specification of Letters Patent.  Patented Aug. 28, 1917.

Application filed February 14, 1916. Serial No. 78,256.

*To all whom it may concern:*

Be it known that we, JOHN L. MASK and THOMAS F. MADDOX, citizens of the United States, residing at Covington, in the county of Newton, State of Georgia, have invented a new and useful Fertilizer-Distributer, of which the following is a specification.

The present invention appertains to fertilizer distributers, and aims to provide a novel and improved device for distributing guano or other fertilizer in front or in rear, or both in front and rear of the soil working blade.

The present distributer has improved features of construction to enhance the utility and efficiency thereof, whereby the delivery of the fertilizer can be controlled effectively.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a bottom plan view of the improved fertilizer distributer.

Fig. 2 is a side elevation thereof, portions being broken away.

Fig. 3 is an enlarged sectional detail of the front discharge spout.

Fig. 4 is a top plan view of the device showing the partition.

Fig. 5 is a side elevation of the partition.

If desired, the fertilizer distributer can be applied to an ordinary plow beam 1, although a special beam can be used if desired, the beam 1 having a standard 2 carrying the blade 3 for furrowing the soil. A pair of downwardly projecting brackets 4 are pivoted, as at 5, to the beam 1 adjacent its rear end, and a packing wheel or rolling packer 6 is mounted for rotation between the lower free ends of the brackets 4 to pack the soil in rear of the blade 3. The handles 7 are attached to the brackets 4, and said brackets have arcuate slotted portions 8 through which a clamping bolt 9 extends, said bolt being carried by the beam 1, whereby the positions of the handles 7 and brackets 4 can be adjusted when the bolt is loosened.

A hopper or bin 10 for containing the fertilizer is mounted upon the beam 1 above the standard 2, and an elongated longitudinal conveyer trough or box 11 is secured to one side of the beam 1 so as to extend forwardly from below the bottom of the hopper 10 to the desired distance ahead of the blade 3. The bottoms of the trough 11 and hopper 10 are each provided with a depending outlet nozzle 12 to which are rotatably connected discharge spouts 13 having their lower ends curved to one side. The spout 13 of the hopper 10 is located at that side of the beam 1 opposite the trough 11 and adjacent the rear end of the hopper, while the other spout 13 of the trough 11 is located adjacent the forward end thereof. Each nozzle 12 has a lower outturned flange 14 upon which is seated an inturned flange 15 at the upper end of the spout 13, and this enables the trough 13 to be rotated about a vertical axis so as to discharge the fertilizer in the desired direction, it being an easy matter to set the spouts 13 at the desired positions. The bottom of the hopper 10 has an outlet opening 16 above the rear end of the trough 11, so that the fertilizer can fall into the trough 11.

The flow of the fertilizer from the hopper 10 into the rear spout 13 and rear end of the trough 11 is controlled by a pair of transversely slidable valves 17 movable upon the bottom of the trough and extending through the sides of the hopper. The outer ends of the valves are pivotally connected with the lower ends of a pair of levers 18 at the opposite sides of the hopper, and pivoted between their ends to outstanding brackets 19 attached to the sides of the hopper. The upper arms of the levers 18 are engageable in outstanding notched brackets 20 carried by the rear upper corners of the hopper, the levers 18 being resilient in order to normally engage the notched brackets 20 to hold the levers in position, although the levers can be readily sprung away from the notches so that the levers can be swung to adjust the valves 17. By swinging the levers 18, the valves can be slid inwardly and outwardly to control the discharge of fertilizer as desired.

A transverse shaft 21 is journaled through the beam 1 and has secured to one end a bevel gear 22 meshing with a bevel gear 23 secured to the rear protruding end or terminal of a conveyer worm 24 mounted for rotation within the trough 11. A sprocket wheel 23 is secured to the other end of the shaft 21, and the shaft 26 of the packing wheel 6 which is journaled through the brackets 4 has a sprocket wheel 27 secured to one end.

A transverse agitator shaft 28 is journaled through the sides of the hopper 10, and carries radial arms 29 within the hopper for agitating the fertilizer and working it toward the outlet openings. The protruding end of the shaft 28 has a sprocket wheel 31 secured thereto, and an idler sprocket wheel 32 is rotatable upon a spindle 33 adjustably carried by a slotted strip or bar 34 terminally secured to one side of the hopper 10. An endless sprocket chain 35 is trained around the sprocket wheels, having its upper run spaced above the sprocket wheels 25 and 31, and having its lower run engaging the lower portion of the sprocket wheel 31 and engaging the upper portion of the sprocket wheel 25. When the distributer is moved over the ground, the rotation of the wheel or roller 6 will actuate the chain 35 for rotating the sprocket wheels 25 and 31 to actuate the conveyer worm 24 and agitator.

The idler sprocket wheel 32 being adjustably mounted can be adjusted for rendering the chain taut under different conditions, and to reverse the rotation of the agitator, the lower run of the sprocket chain is moved from below the sprocket wheel 31 onto the top thereof, as indicated in dotted lines in Fig. 2.

The fertilizer which drops into the rear end of the trough 11 is carried forwardly by the worm 24 and drops through the forward spout 13 onto the ground in front of the blade 3. Since the valves 17 can be operated independently, the fertilizer can be discharged either through the front or rear spout, or through both of the spouts simultaneously, according to the condition of the soil and other circumstances. The spouts 13 can also be adjusted to different angular positions for directing the fertilizer to the desired point in front or in rear of the blade 3. This enables the fertilizer to be applied in the most effective manner to the soil, and the supply of fertilizer in front and in rear of the blade 3 can be controlled and regulated as desired. The fertilizer dropped onto the ground in front of the blade 3 will be worked thoroughly therewith, and the fertilizer discharged from the rear spout will be directed into the furrow made by the blade 3 to be covered by the soil. The fertilizer dropped onto the ground from the forward spout fertilizes the top soil.

A division board or partition 36 is insertible downwardly within the hopper so as to assume a longitudinal position between the opposite sides of the hopper, to divide the hopper into two bins or compartments for different fertilizers, whereby one fertilizer can be delivered in front of the blade 3 while the other is delivered in rear thereof. The partition 36 has a lower slot 37 for receiving the shaft 28, and the agitators of said shaft are located at the opposite sides of the partition when the partition is in place.

Having thus described the invention, what is claimed as new is:

1. A fertilizer distributer embodying a hopper, an adjustable bracket, a wheel carried by said bracket having a sprocket wheel attached thereto, an agitator within the hopper, a sprocket wheel connected to the agitator, discharge means for the hopper having a sprocket wheel, an adjustably mounted idler sprocket wheel, and an endless sprocket chain trained around the first and fourth mentioned sprocket wheels, the second and third mentioned sprocket wheels being located between the first and fourth mentioned sprocket wheels and being so arranged that one run of the sprocket chain is engageable either under the second mentioned sprocket wheel and over the third mentioned sprocket wheel, or over the second mentioned sprocket wheel above and spaced from the third mentioned sprocket wheel.

2. A fertilizer distributer embodying a fertilizer hopper, a pair of discharge spouts for the hopper at opposite sides thereof, a transverse agitator shaft journaled through the sides of the hopper, a longitudinal vertical partition fitting removably in the hopper and having an open slot extending from its lower edge and receiving said shaft, agitator arms carried by said shaft at opposite sides of said partition, and valves for independently controlling the discharge of fertilizer into said spouts.

In testimony that we claim the foregoing as our own, we have hereto affixed our signatures in the presence of two witnesses.

JOHN LEWIS MASK.
THOMAS FRANKLIN MADDOX.

Witnesses:
J. H. CARROLL,
JNO. B. DAVIS.

Copies of this patent may be obtained for five cents each, by addressing the "Commissioner of Patents, Washington, D. C."